United States Patent [19]

Kawahara

[11] Patent Number: 5,739,923
[45] Date of Patent: Apr. 14, 1998

[54] PICTURE IMAGE INPUT DEVICE

[75] Inventor: Atsushi Kawahara, Kanagawa-ken, Japan

[73] Assignee: Nikon Corporation, Tokyo, Japan

[21] Appl. No.: 562,579

[22] Filed: Nov. 24, 1995

[30] Foreign Application Priority Data

Nov. 24, 1994 [JP] Japan .................. 6-314098

[51] Int. Cl.⁶ .................. H04N 1/024; H04N 1/04
[52] U.S. Cl. .................. 358/473; 358/474; 358/496; 358/497; 355/407; 355/50
[58] Field of Search .................. 358/473, 474, 358/494, 496, 497; 355/407, 50, 84; 399/16, 17, 367

[56] References Cited

U.S. PATENT DOCUMENTS

| | | | |
|---|---|---|---|
| 4,429,333 | 1/1984 | Davis et al. | 358/496 |
| 4,652,937 | 3/1987 | Shimura et al. | 358/476 |
| 5,172,243 | 12/1992 | Hayashi et al. | 358/400 |
| 5,196,950 | 3/1993 | Fukoka et al. | 358/475 |
| 5,293,257 | 3/1994 | Masao | 358/472 |
| 5,453,611 | 9/1995 | Oozu et al. | 358/514 |

*Primary Examiner*—Edward L. Coles, Sr.
*Assistant Examiner*—Tia M. Harris
*Attorney, Agent, or Firm*—Oliff & Berridge, PLC

[57] ABSTRACT

A picture image input device having the capabilities of a sheet fed scanner with respect to sheet-type original media and realizing the convenience of a hand scanner with respect to original media such as books and the like. The picture image input device includes a light source that emits light for reading an original medium, an image sensor, a projection optical system that composes an image of the original medium on the image sensor, a driving unit that moves the original medium relative to the image sensor and a folding joint unit that changes the usage state between one of an open state and a folded state. In the open state the picture image input device functions as a hand scanner. In the closed state the picture image input device functions as a sheet fed scanner. The reading position of the original medium is the boundary between a reading unit and a driving unit of the picture image input device in the folded state.

19 Claims, 4 Drawing Sheets

PICTURE IMAGE INPUT DEVICE

BACKGROUND OF THE INVENTION

1. Field of the Invention

The present invention relates to a picture image input device that can connect to a personal computer or the like. The picture image input device is optimal for small, lightweight scanners used to input picture image information. The picture image input device incorporates the capabilities and benefits of a sheet fed scanner and a hand scanner.

2. Description of Related Art

Examples of conventional types of small, lightweight scanners are shown in FIGS. 6 and 7. A paper scrolling type scanner, also called a sheet fed scanner, is shown in FIG. 6. The scrolling paper scanner internally includes a paper scrolling mechanism and a reading unit to read a sheet-type original media 1. A hand held type scanner is shown in FIG. 7. The hand scanner reads the picture images on an original medium 1 by moving on the original medium 1 in the direction indicated by the arrow. A schematic cross-sectional view showing the internal structures of a conventional hand scanner is shown in FIG. 8.

As shown in FIG. 8, the original medium 1 is illuminated by a linear light source 2, for example a line of LEDs, and the LED light reflected from the original medium 1 is projected and reduced onto a CCD linear sensor 5 by mirror 3 and a lens unit 4.

On a bottom surface of the hand scanner, a roller 6 is provided. The roller 6 rotates as the scanner is moved by hand. The scanner further conducts position detection in the slow-scan direction using an encoder disk 8 linked to the roller 6 by an idle roller 7. FIG. 8 shows an example of a manually operated hand scanner. However, the roller 6 can be a self-operating roller that is driven to rotate by a built-in motor.

These conventional types of scanners have a number of problems. The sheet fed scanner cannot read books and bound documents. The hand scanner can read bound documents but because the hand scanner moves across the top of the original medium skewing can be created, particularly for manual hand scanners. Further, high quality picture reading is difficult to achieve when the hand scanner speed becomes too large.

SUMMARY OF THE INVENTION

It is an object of the present invention to solve the foregoing conventional scanner problems. It is a further object to provide a scanner that produces the performance of the sheet fed scanner for sheet-type original media and maintains the convenience of the hand scanner for original media such as books or the like.

In order to achieve these and other objects, a picture image input device includes a light source that emits light for reading an original medium, an image sensor, a projection optical system that composes an image of the original medium on the image sensor, an original medium driving unit that moves the original medium relative to the image sensor, and a folding joint unit that changes the scanner state between an open state and a folded state. In the folded state the picture image input device functions as a sheet fed scanner. In the open state the picture image input device functions as a hand scanner. The reading position of the original medium is a boundary between a reading unit and a driving unit of the picture image input device in the folded state.

By having the shape of the scanner body change between a folded state and an open state, the picture image input device produces the performance of the sheet fed scanner for sheet-type original media and maintains the convenience of the hand scanner for original media such as books or the like.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
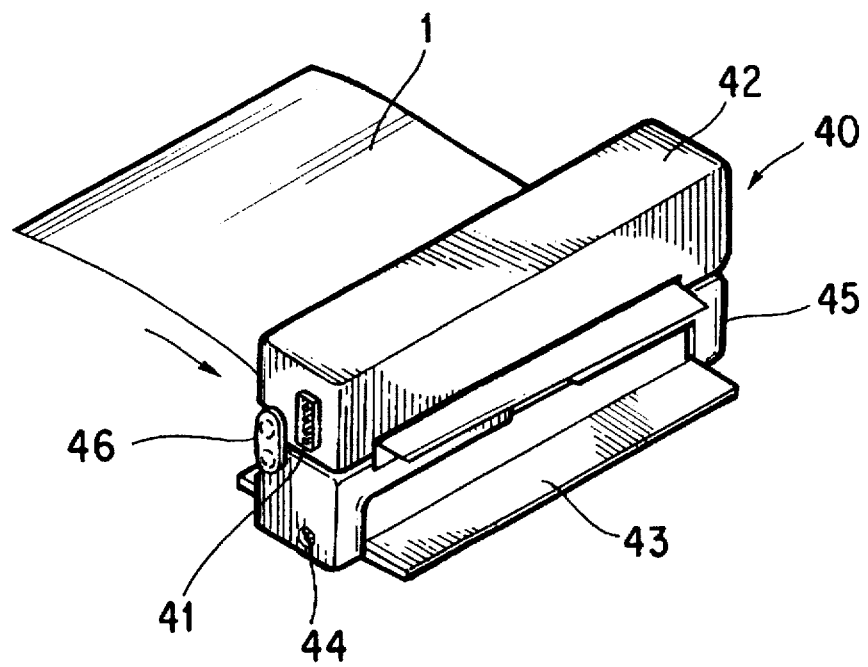
FIG. 1 is an oblique view showing an embodiment of a picture image input device in a folded state according to the present invention.
Figure 2:
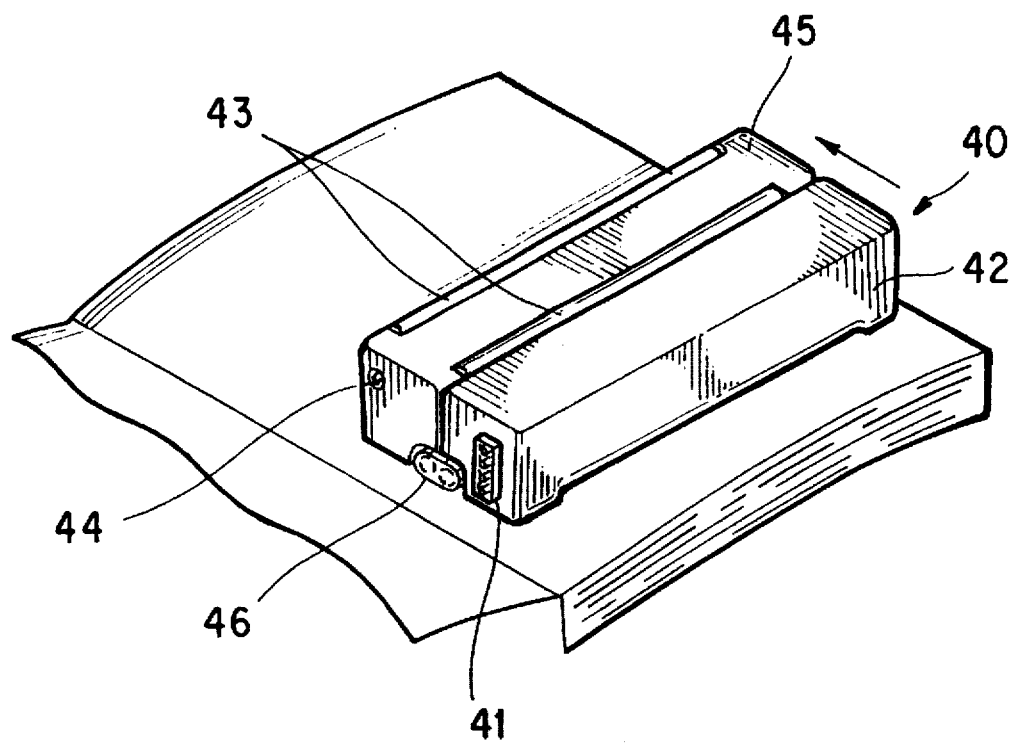
FIG. 2 is an oblique view showing the picture image input device of FIG. 1 in an open state.

FIG. 1 and 2 are oblique drawings showing one preferred embodiment of the picture image input device of the present invention. A scanner body 40 can be used in a folded state to function as a sheet fed scanner as shown in FIG. 1. The scanner body 40 can also be used in an open state to function as either an automatic or manual type of hand scanner as shown in FIG. 2.

As shown in FIG. 1, the scanner body 40 includes a reading unit 42 having an interface connector 41. The scanner body 40 further includes a driving unit 45 having a stand 43, a DC input connector 44 and a joint member 46. The joint member 46 connects the reading unit 42 to the driving unit 45. The DC input connector 44 permits charging of an internal battery (not shown). The stand 43 can be extended from the scanner body 40 when the scanner is used as a sheet feed scanner in the folded state. The stand 43 serves to prevent the folded state scanner 40 from tipping over. The reading unit 42 and the driving unit 45 shown in FIG. 1 can separate to place the scanner body 40 in the open state by rotating with the joint member 46 as the axis. When the scanner is used as a hand scanner as shown in FIG. 2, the stand 43 is housed in the scanner body 40. In both FIGS. 1 and 2, interface cables (not shown) may be attached to the interface connector 41.

Figure 3:
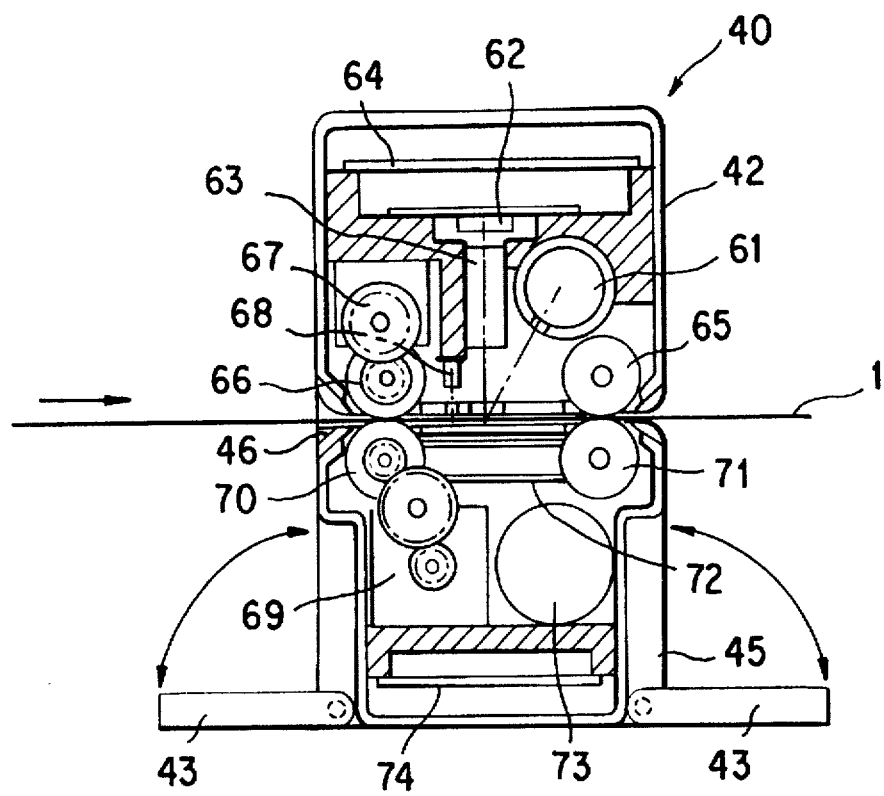
FIG. 3 is a schematic cross-sectional view showing the picture image input device of FIG. 1.
Figure 4:
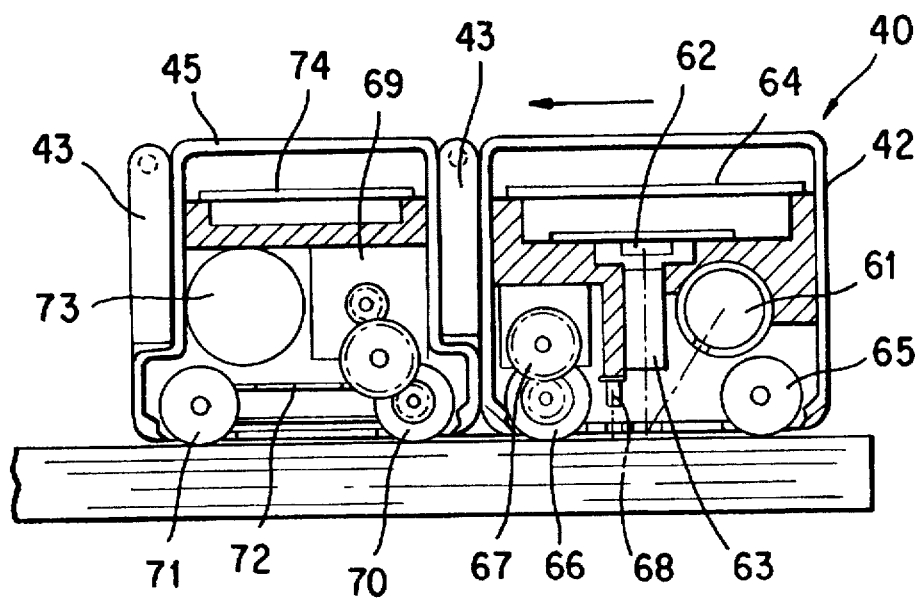
FIG. 4 is a schematic cross-sectional view showing the picture image input device of FIG. 2.

FIG. 3 shows the internal positioning of the scanner body 40 when the scanner is used as the sheet fed scanner shown in FIG. 1. FIG. 4 shows the internal positioning of the scanner body 40 when the scanner is used as the hand scanner of FIG. 2.

As shown in FIG. 3, a linear light source 61 is positioned inside the reading unit 42 to illuminate an original medium 1. A lens array 63 projects the light reflected from the original medium 1 onto a CCD linear sensor 62. Signal processing circuits and interface circuits are mounted on a circuit board 64. An encoder 67 is linked to a roller 66 of a pair of rollers 65 and 66. Finally, a sensor 68 detects the absence or presence of the original medium 1.

A battery 73 and a stepping motor 69 are located inside the driving unit 45 for driving a pair of rollers 70 and 71 connected by a belt 72. A pair of stands 43 connect to the outside of the driving unit 45. Finally, a substrate 74 supports a driving circuit of the motor 69 (not shown) and a circuit for charging the internal NiCd battery (not shown).

The original medium 1 is interposed between the rollers 66 and 70 and the rollers 65 and 71 and scrolls in the direction of the indicating arrows (to the right in FIG. 3 and to the left in FIG. 4) controlled by the driving force of the motor 69. The scrolling amount of the original medium 1 is detected by the encoder 67 and used to read information of the original medium 1 by the CCD linear sensor 62 at set intervals.

Figure 5:
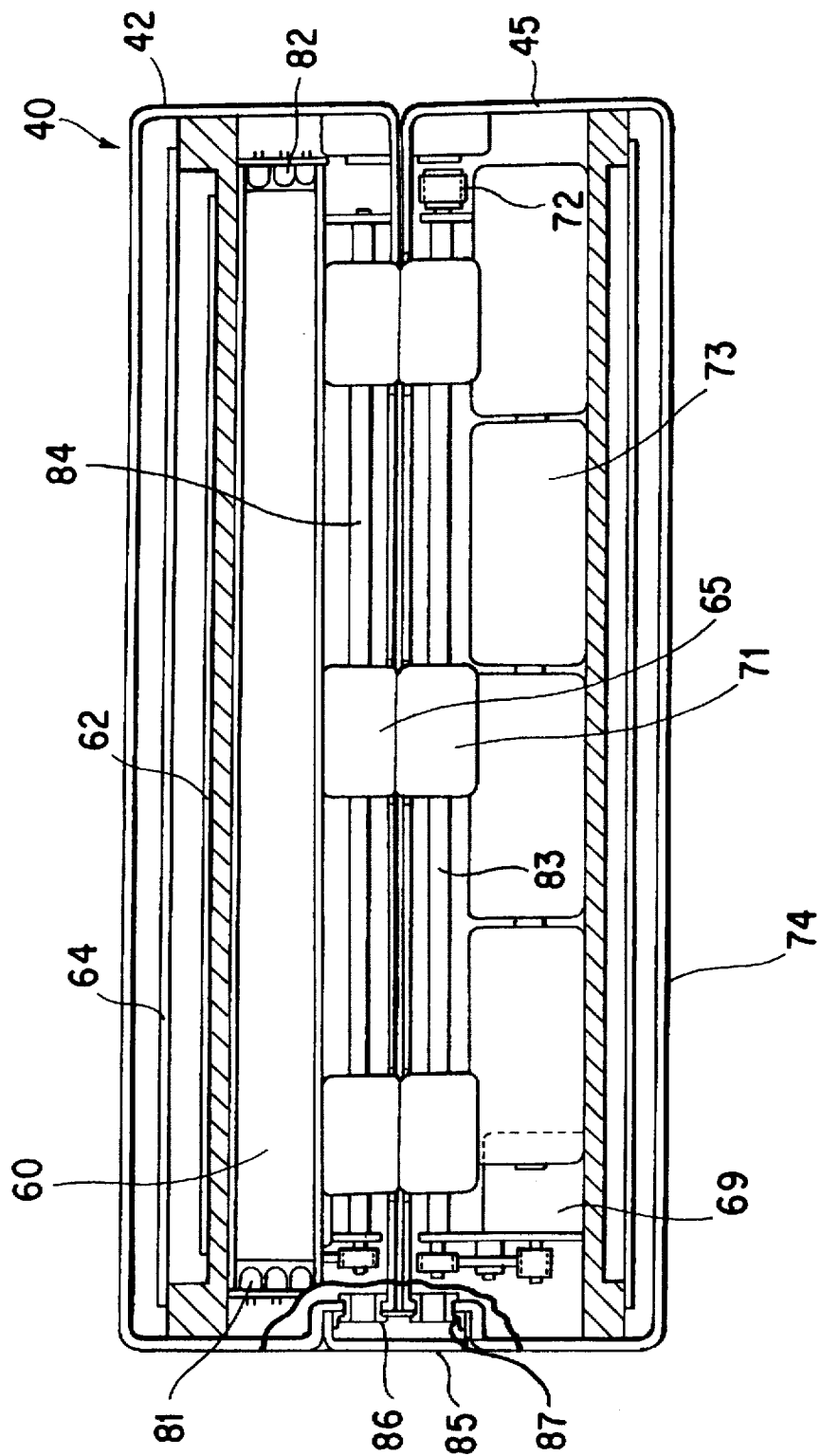
FIG. 5 is another schematic cross-sectional (bottom) view showing the picture image input device of FIG. 1.
Figure 6:
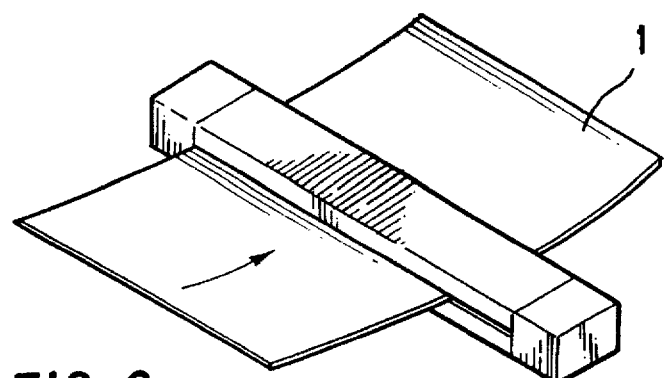
FIG. 6 is an oblique view showing one type of conventional image input device.
Figure 7:
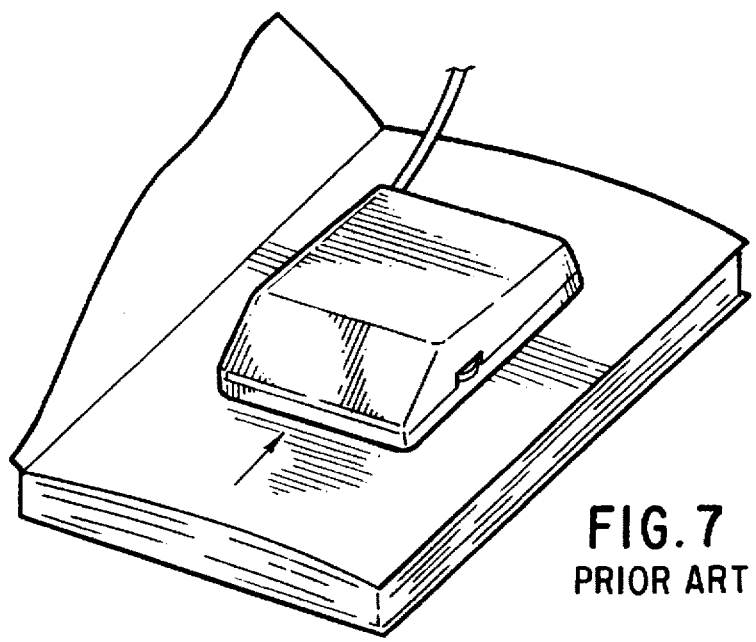
FIG. 7 is an oblique view showing another type of conventional image input device.
Figure 8:
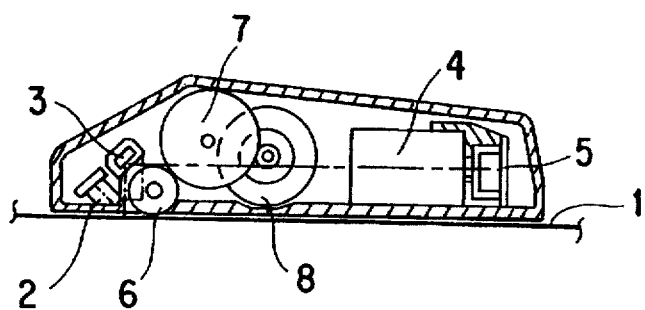
FIG. 8 is a schematic cross-sectional view showing the conventional picture image input device type of FIG. 7.

In FIG. 5, a transparent transfer light rod 60, and light from an linear dispersion unit (not shown) on top of the linear light source 61 are used for illumination.

The light source can be LED arrays 81 and 82 provided near the two edge surfaces of the transfer light rod 61. In a color scanner, LEDs of colors red, blue and green are caused to flash for each line. Rollers 71 and 65 have rotation shafts 83 and 84, respectively. The cover 85 of the joint member 46 includes a pair of hollow joint shafts 86 and 87. Cables (not shown) can pass through the hollow sections of these joint shafts 86 and 87 to transfer signals and power between the reading unit 42 and the driving unit 45.

FIG. 4 shows a schematic cross-section of the scanner body 40 in the open state being used as a hand scanner. When the scanner is manually moved, the power source of the motor 69 is disconnected. Further, manual movement is easily performed because of a slip mechanism (not shown) between the motor 69 and the roller 70. In addition, when the scanner is to be used as an automated hand scanner, power can be supplied to the motor 69 to move the entire scanner body 40 under the control of a personal computer or the like. In this case, the scanner movement distance is preferably set using the software of the personal computer or the like in order to prevent overruns of the original medium 1.

One preferred embodiment according to the present invention has been described above, but numerous variations are possible. For example, in the preferred embodiment a rechargeable secondary battery is used, but an external charging method, replaceable alkali-manganese batteries or the like are acceptable. Further, a member to mutually anchor the reading unit 42 and the driving unit 45 to each other in the closed state (the folded state) and the open state can be provided. Furthermore, the driving motor 69 can be inside the reading unit 42 and corresponding rollers are in the driving unit 45. Additionally, driving motors 69 can be in both the reading unit 42 and the driving unit 45.

The method of changing the light source was described above for one preferred embodiment. In the case of a color scanner, a color image sensor can be used. Where a color image sensor is used, preferably the linear light source 61 is a white light source with high color rendering properties.

A linear light source and linear image sensor have been described above. However, a surface light source and an area sensor (two-dimensional sensor) can also be used. When the surface light source and the area sensor are used, the process of moving to a new area after reading a designated area can be repeated. For the linear image sensor there is the possibility that the reading position can shift if the linearity of scrolling is poor when the scanner is mounted on the original medium. However, when the surface light source and the area sensor are used, position shifting within the reading area can be avoided because the original document does not move relative to the scanner while the designated area is being read.

The picture image input device of the present invention changes the position of the scanner body between a folded state and an open state. Thus, in the above preferred embodiments, a small, lightweight scanner can be realized that combines the high precision and high image quality reading of a sheet fed scanner with the access to bound original media of a hand scanner.

In other words, the performance of the sheet fed scanner with respect to sheet-type original media and the convenience of the hand scanner with respect to original media such as books are realized in one picture image input device.

While this invention has been described in conjunction with the specific embodiments outlined above, it is evident that many alternatives, modifications and variations will be apparent to those skilled in the art.

Accordingly, the preferred embodiments of the invention as set forth above are intended to be illustrative, not limiting. Various changes may be made without departing from the spirit and scope of the invention as defined in the following claims.

What is claimed is:

1. A picture image input device, comprising:
   a light source that emits light to illuminate an original medium for reading;
   an image sensor;
   a projection optical system that forms an image of the original medium on the image sensor;
   a driving unit that moves the original medium relative to the image sensor; and
   a folding joint unit that changes a usage state of the picture image input device between an open state and a folded state, wherein the driving unit moves the original medium when the picture image input device is in the folded state and moves the picture image input device along the original medium in the open state.

2. The picture image input device according to claim 1, wherein the light source is a linear light source and the image sensor is a linear image sensor.

3. The picture image input device according to claim 1, further comprising a stand to prevent the picture image input device from tipping over in the folded state.

4. The picture image input device according to claim 1, further comprising an interface circuit that receives movement control signals, the driving unit moving and halting the picture image input device based on the movement control signals in the open state.

5. The picture image input device according to claim 1, wherein a reading position of the original medium is a boundary between the image sensor and the original medium driving unit in the folded state.

6. The picture image input device according to claim 1, wherein the image sensor is a color image sensor.

7. The picture image input device according to claim 1, wherein the light source is a surface light source and the image sensor is an area sensor.

8. A picture image input device, comprising:
   a light source that emits light for reading onto original medium;

a projection optical system forming light from the original medium into an image;

a reading unit containing at least a linear image sensor that receives the image from the projection optical system and converts the image into an electrical signal;

a driving unit that moves the original medium relative to the reading unit; and a folding joint unit that can switch between a closed position where the reading unit and the driving unit are joined with the original medium interposed between the reading unit and the driving unit, and an open position where the reading unit and the driving unit are positioned to move along the original medium.

9. The picture image input device according to claim 8, further comprising an interface circuit that receives movement control signals, the driving unit moving and halting the picture image input device based on the movement control signals when the folding joint unit is in the open position, the interface circuit outputting the electrical signal corresponding to the image.

10. The picture image input device according to claim 8, further comprising a stand to prevent the picture image input device from tipping over when the folding joint unit is in the closed position.

11. The picture image input device according to claim 8, wherein a reading position of the original medium is a boundary between the reading unit and the driving unit when the folding joint unit is in the closed position.

12. The picture image input device according to claim 8, wherein a locking member anchors the reading unit to the driving unit when the folded joint unit is in the closed position and the open position.

13. The picture image input device according to claim 8, further comprising a power source, said power source being one of a battery and an interface to an external power source.

14. A picture image input device, comprising:

a light source that illuminates an original medium for reading;

an image sensor;

image forming means for forming an image of the original medium on the image sensor;

driving means for moving the original medium relative to the image sensor; and folding means for changing the picture image input device between one of an open state and a folded state, wherein the driving means moves the original medium when the picture image input device is in the folded state and the picture image input device moves along the original medium in the open state.

15. The picture image input device according to claim 14, wherein the light source is a linear light source and the image sensor is a linear image sensor.

16. The picture image input device according to claim 14, further comprising interface means for receiving control signals, the picture image input device reading the original medium by moving the picture image input device based on the control signals in the open state and by moving the original medium based on the control signals in the folded state.

17. The picture image input device according to claim 14, wherein a reading unit includes at least the image sensor and the image forming means; and a driving unit includes at least the driving means, the folding means switching between the folded state and the open state by positioning the reading unit and the driving unit relative to each other.

18. The picture image input device according to claim 14, further comprising locking means for anchoring the picture image input device in the open state and the folded state.

19. A picture image input device, comprising:

a light source that emits light to illuminate an original medium for reading;

an image sensor;

a projection optical system that forms an image of the original medium on the image sensor;

a driving unit that enables to move the original medium relative to the image sensor or enables to move the picture image input device itself along the original medium; and a switching mechanism that changes between a first mode of the picture image input device, in which the image sensor is closed with respect to the exterior, and a second mode of the picture image input device, in which the image sensor is exposed to the exterior, wherein the driving unit moves the original medium with respect to the image sensor in the first mode, and wherein the driving unit moves the image sensor with respect to the original medium in the second mode.

* * * * *